(12) United States Patent
Chahwan et al.

(10) Patent No.: US 8,885,283 B1
(45) Date of Patent: Nov. 11, 2014

(54) DISK DRIVE ADJUSTING WRITE BLOCK SIZE BASED ON DETECTED VIBRATION

(75) Inventors: Alain Chahwan, Irvine, CA (US); Jianguo Zhou, Foothill Ranch, CA (US); Wei Xi, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 336 days.

(21) Appl. No.: 13/288,125

(22) Filed: Nov. 3, 2011

(51) Int. Cl.
*G11B 21/02* (2006.01)

(52) U.S. Cl.
USPC ................ 360/75; 360/31; 360/51; 360/53; 360/77.02

(58) Field of Classification Search
None
See application file for complete search history.

(56) References Cited

U.S. PATENT DOCUMENTS

| | | | |
|---|---|---|---|
| 6,215,608 B1 | 4/2001 | Serrano et al. | |
| 6,445,521 B1 | 9/2002 | Schaff et al. | |
| 6,445,524 B1 * | 9/2002 | Nazarian et al. | 360/49 |
| 6,496,320 B1 | 12/2002 | Liu | |
| 6,507,450 B1 * | 1/2003 | Elliott | 360/77.08 |
| 6,636,376 B1 * | 10/2003 | Ho | 360/77.02 |
| 6,657,801 B1 * | 12/2003 | Chue et al. | 360/48 |
| 6,680,609 B1 | 1/2004 | Fang et al. | |
| 6,693,764 B1 | 2/2004 | Sheh et al. | |
| 6,714,371 B1 | 3/2004 | Codilian | |
| 6,714,372 B1 | 3/2004 | Codilian et al. | |
| 6,717,757 B1 | 4/2004 | Levy et al. | |
| 6,735,033 B1 | 5/2004 | Codilian et al. | |
| 6,788,489 B1 | 9/2004 | Chang et al. | |
| 6,795,262 B1 * | 9/2004 | Codilian et al. | 360/60 |
| 6,845,405 B1 | 1/2005 | Thelin | |
| 6,900,958 B1 | 5/2005 | Yi et al. | |
| 6,967,810 B2 | 11/2005 | Kasiraj et al. | |
| 6,968,422 B1 | 11/2005 | Codilian et al. | |
| 6,977,791 B2 * | 12/2005 | Zhu et al. | 360/75 |
| 6,995,943 B1 | 2/2006 | Shrestha et al. | |
| 6,999,260 B2 * | 2/2006 | Abe et al. | 360/60 |
| 7,027,255 B2 | 4/2006 | Schmidt | |
| 7,082,007 B2 | 7/2006 | Liu et al. | |
| 7,227,708 B2 | 6/2007 | Feng | |
| 7,362,535 B2 * | 4/2008 | Kumano | 360/75 |
| 7,394,607 B2 | 7/2008 | Ohno et al. | |
| 7,408,731 B2 | 8/2008 | Uemura et al. | |
| 7,417,813 B2 | 8/2008 | Lim et al. | |
| 7,471,483 B1 * | 12/2008 | Ferris et al. | 360/75 |
| 7,474,491 B2 | 1/2009 | Liikanen et al. | |
| 7,525,745 B2 | 4/2009 | Nitta | |
| 7,529,050 B2 | 5/2009 | Shen et al. | |
| 7,545,593 B1 * | 6/2009 | Sun et al. | 360/31 |
| 7,567,397 B2 | 7/2009 | Lu | |
| 7,760,456 B2 * | 7/2010 | Ding et al. | 360/60 |
| 7,885,024 B2 | 2/2011 | Boonyurn | |
| 7,916,421 B1 | 3/2011 | Liikanen et al. | |
| 7,933,090 B1 | 4/2011 | Jung et al. | |
| 8,125,724 B1 | 2/2012 | Nichols et al. | |
| 8,159,775 B2 * | 4/2012 | Armendariz et al. | 360/79 |
| 8,611,032 B2 | 12/2013 | Champion et al. | |
| 2003/0112547 A1 * | 6/2003 | Koso et al. | 360/78.05 |

(Continued)

*Primary Examiner* — Dismery Mercedes

(57) ABSTRACT

A disk drive is disclosed comprising a head actuated over a disk having a plurality of data tracks. A vibration is detected, and a write operation is configured to write a first plurality of blocks and a second plurality of blocks to a target data track based on the detected vibration. The first plurality of blocks are written to the target data track during a first revolution of the disk, and the second plurality of blocks are written to the target data track during a second revolution of the disk.

12 Claims, 5 Drawing Sheets

(56) References Cited

U.S. PATENT DOCUMENTS

| | | |
|---|---|---|
| 2004/0125486 A1 | 7/2004 | Schmidt |
| 2005/0069298 A1 | 3/2005 | Kasiraj et al. |
| 2005/0071537 A1 | 3/2005 | New et al. |
| 2005/0248867 A1* | 11/2005 | Choi ................................ 360/30 |
| 2006/0044658 A1 | 3/2006 | Ma |
| 2006/0215307 A1 | 9/2006 | Yoshida et al. |
| 2006/0291101 A1* | 12/2006 | Takaishi ........................ 360/244 |
| 2007/0030588 A1 | 2/2007 | Tsuchinaga et al. |
| 2007/0070540 A1 | 3/2007 | Noguchi et al. |
| 2009/0034380 A1 | 2/2009 | Ngwe et al. |
| 2009/0073594 A1 | 3/2009 | Ito et al. |
| 2010/0328798 A1 | 12/2010 | Vaidyanathan et al. |
| 2011/0085260 A1* | 4/2011 | Wada et al. ...................... 360/75 |
| 2011/0310506 A1* | 12/2011 | Suzuki et al. .............. 360/77.02 |

* cited by examiner

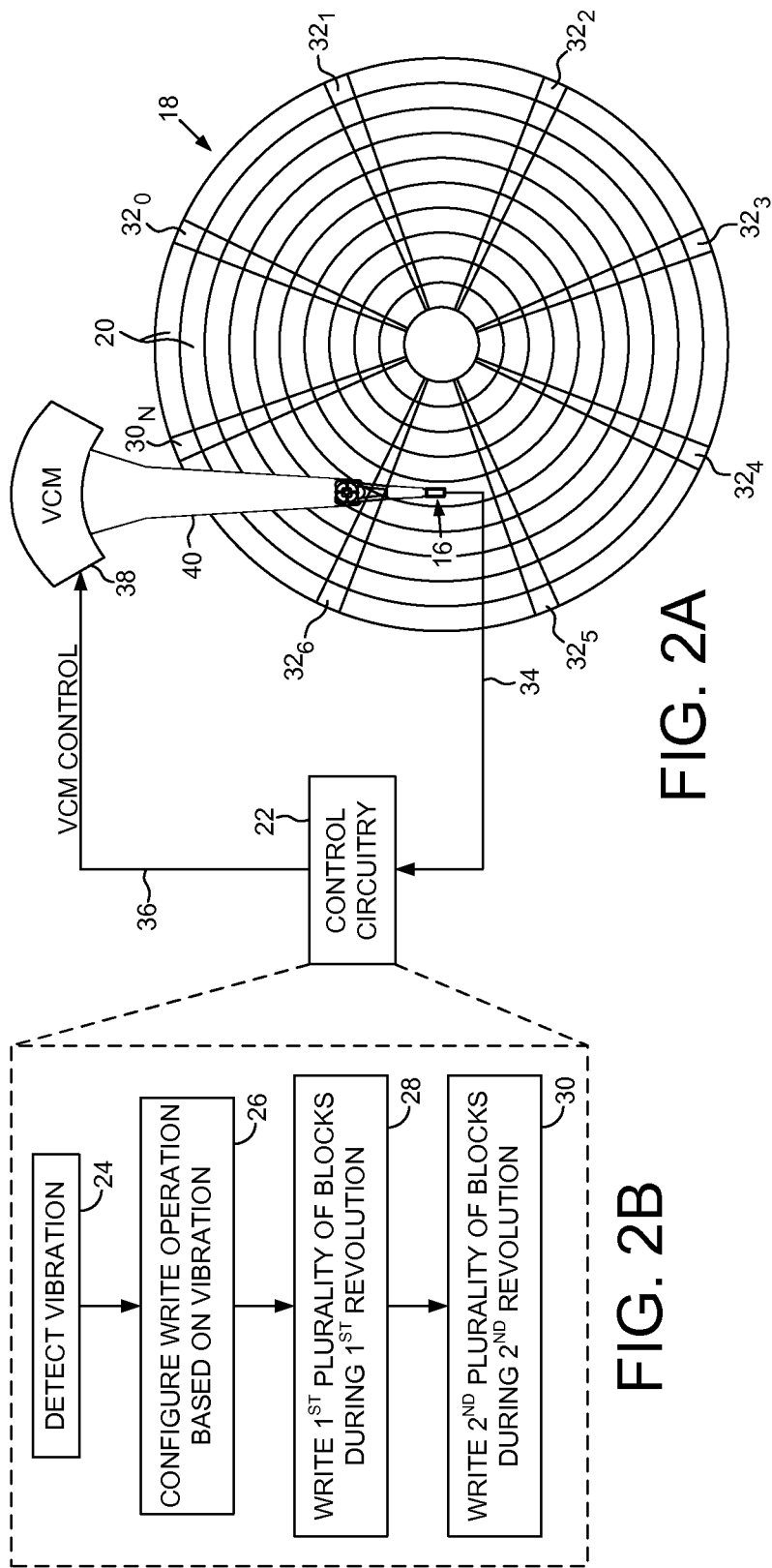

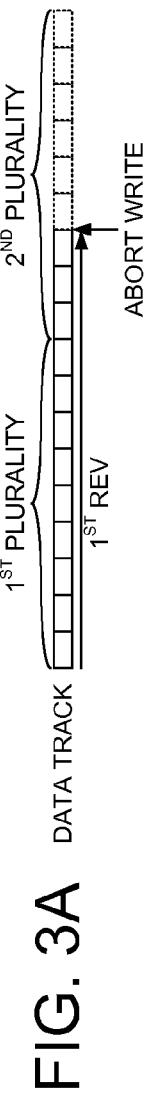
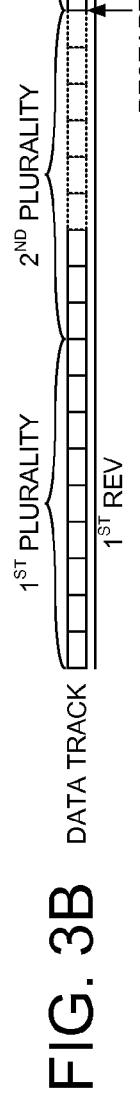
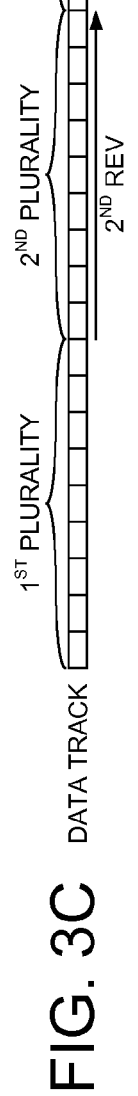
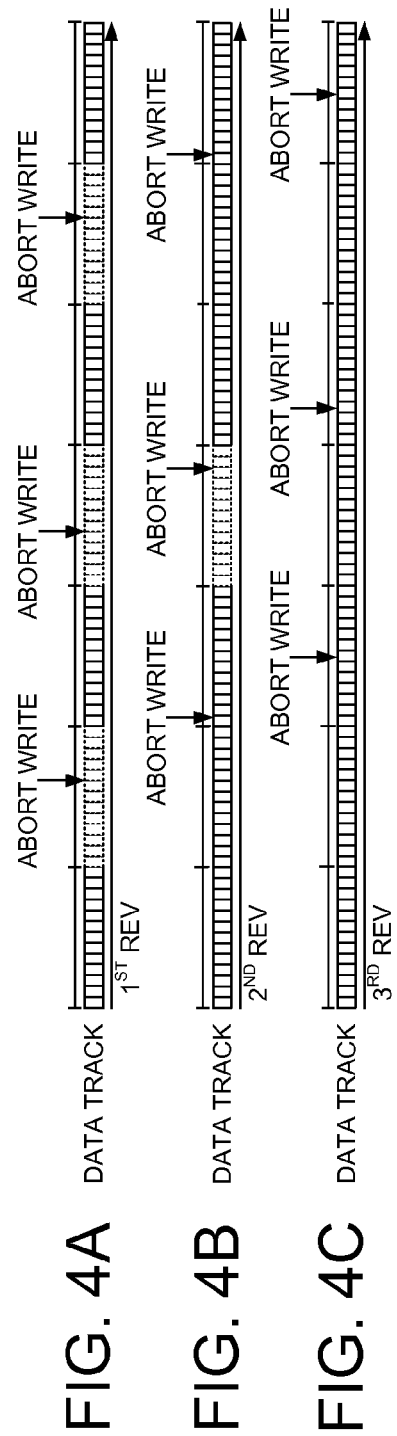

DISK DRIVE ADJUSTING WRITE BLOCK SIZE BASED ON DETECTED VIBRATION

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a VCM servo controller to control the velocity of the actuator arm as it seeks from track to track.

FIG. 1 shows a prior art disk format 2 comprising a number of servo tracks 4 defined by concentric servo sectors $6_0$-$6_N$ recorded around the circumference of each servo track, wherein data tracks are defined relative to the servo tracks 4 and each data track comprises a number of data sectors. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. A dynamic fly height (DFH) servo controller may measure the fly height of the head and adjust the fly height actuator to maintain a target fly height during write/read operations.

Certain conditions may affect the ability of the VCM servo controller to maintain the head along the centerline of a target data track and/or the ability of the DFH servo controller to maintain the target fly height. For example, an external vibration applied to the disk drive or degradation and/or malfunction of the spindle motor that rotates the disks may induce a disturbance in the servo systems that cannot be adequately compensated. This is of particular concern during write operations when an off-track write may erase data in adjacent tracks, or an excessive fly height may render the written data unrecoverable due to under-saturation of the magnetic media. Accordingly, a disk drive will typically abort a write operation when the position error signal of the VCM servo controller or the fly height measurement of the DFH servo controller exceeds a write unsafe limit.

BRIEF DESCRIPTION OF THE DRAWINGS

FIG. 2A shows a disk drive according to an embodiment of the present invention comprising a head actuated over a disk.

FIG. 2B is a flow diagram according to an embodiment of the present invention wherein a first plurality of blocks are written to a data track during a first revolution, and a second plurality of blocks are written to a data track during a second revolution.

FIG. 2C illustrates writing the first and second plurality of blocks during the first and second revolutions, wherein the number of blocks written is based on a detected vibration.

FIGS. 3A-3C illustrate an embodiment of the present invention wherein three segments of blocks are written to a data track, a first and third segment are written during a first revolution, and a second segment is written during a second revolution due to being aborted during the first revolution.

FIGS. 4A-4C illustrate an embodiment of the present invention wherein seven segments of blocks are written to a data track during three revolutions as a vibration causes write aborts to shift in phase relative to the disk.

DETAILED DESCRIPTION OF EMBODIMENTS OF THE INVENTION

FIG. 2A shows a disk drive according to an embodiment of the present invention comprising control circuitry 22 operable to execute the flow diagram of FIG. 2B, wherein a vibration is detected (step 24), and a write operation is configured to write a first plurality of blocks and a second plurality of blocks to a target data track based on the detected vibration (step 26). As illustrated in FIG. 2C, the first plurality of blocks are written to the target data track during a first revolution of the disk (step 28), and the second plurality of blocks are written to the target data track during a second revolution of the disk (step 30).

Figure 1:
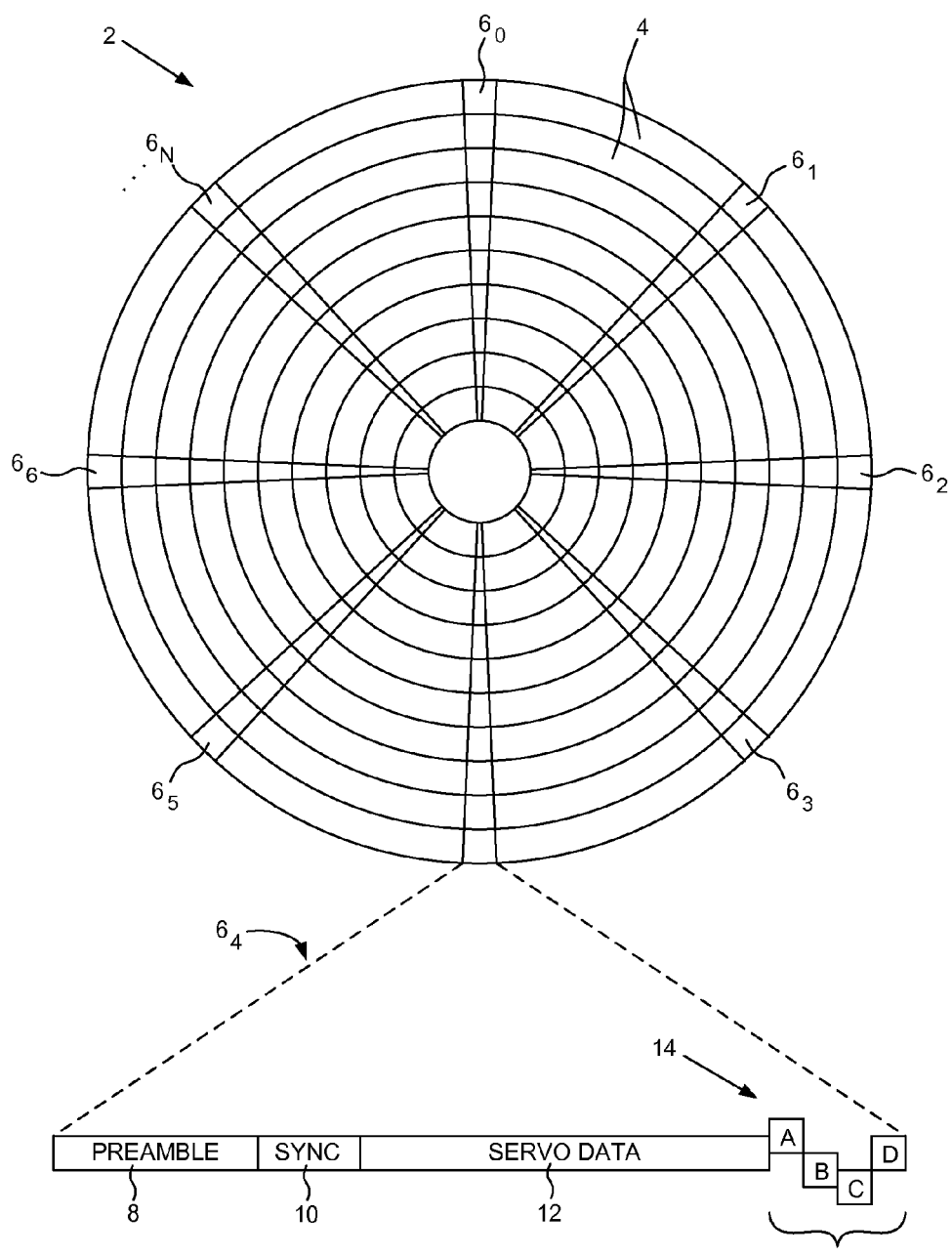
FIG. 1 shows a prior art disk format comprising a plurality of servo tracks defined by embedded servo sectors.

In the embodiment of FIG. 2A, the disk 18 comprises embedded servo sectors $32_0$-$32_N$ that define a plurality of servo tracks, wherein the data tracks 20 are defined relative to the servo tracks (e.g., at the same or higher radial density). The control circuitry 22 processes a read signal 34 emanating from the head 16 to demodulate the servo sectors $32_0$-$32_N$ and generate a position error signal (PES) representing an error between the actual position of the head and a target position relative to a target track. The control circuitry 22 filters the PES using a suitable compensation filter to generate a control signal 36 applied to a voice coil motor (VCM) 38 which rotates an actuator arm 40 about a pivot in order to actuate the head 16 radially over the disk in a direction that reduces the PES. The servo sectors $32_0$-$32_N$ may comprise any suitable position information, such as a track address for coarse positioning and servo bursts for fine positioning. The servo bursts may comprise any suitable pattern, such as the amplitude-based servo pattern shown in FIG. 1, or a suitable phase-based servo pattern.

FIGS. 3A-3B illustrate an embodiment of the present invention wherein data is written to a data track in three segments (a first plurality of blocks, a second plurality of blocks, and a third plurality of blocks). During a first revolution of the disk, the first plurality of blocks are written and then while writing the second plurality of blocks the write is aborted due to a vibration causing an off-track error as shown in FIG. 3A. Prior to reaching the third plurality of blocks, the head is able to reacquire the data track so that the third plurality of bocks can be written during the first revolution as shown in FIG. 3B. During a second revolution of the disk, the control circuitry is able to write the second plurality of the blocks as shown in FIG. 3C without aborting the write.

In one embodiment, the control circuitry is able to write the second plurality of blocks during the second revolution of the disk due to a phase of the vibration shifting relative to the disk over time. This is illustrated in FIGS. 4A-4C which shows an example where a write operation is divided into seven segments, and each segment comprises a plurality of blocks. During a first disk revolution, the control circuitry is able to write segments one, three, five and seven, whereas a write abort occurs while writing segments two, four, and six as shown in FIG. 4A. During a second disk revolution, the location of the write aborts shifts relative to the data track due to a phase of the vibration shifting as shown in FIG. 4B. In the example shown, the write aborts have shifted enough during the second revolution to enable writing segments two and six, whereas the write abort still occurs while writing segment four. The write aborts at segments three and seven do not actually occur since these segments were already written during the first revolution. During a third revolution, the write aborts have shifted enough to enable segment four to be written as shown in FIG. 4C (the write aborts at segments three, five, and seven do not actually occur since these segments were already written).

Figure 5:
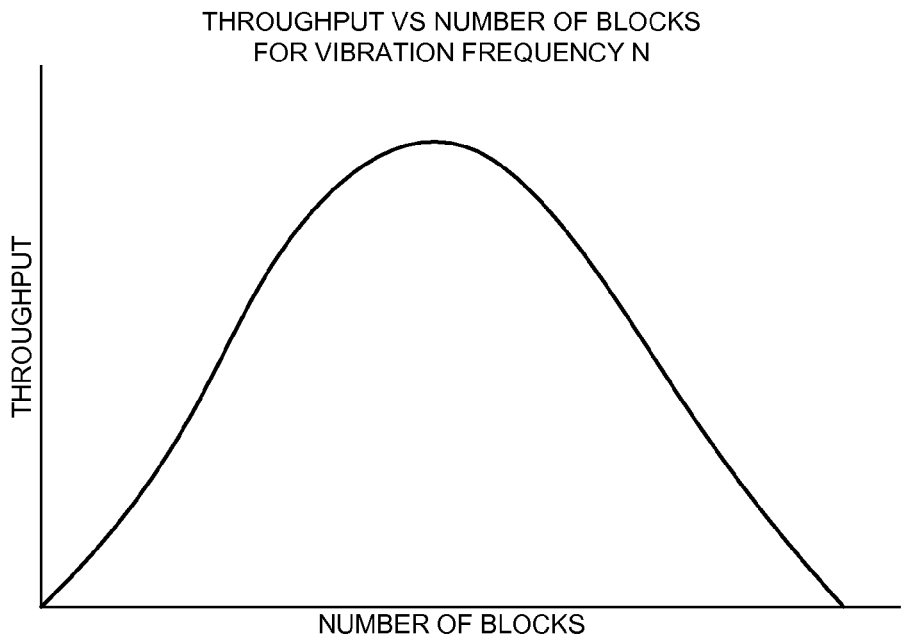
FIG. 5 is a graph according to an embodiment of the present invention illustrating that for a given vibration frequency, the write throughput of the disk drive varies based on a number of blocks written per segment.

In an embodiment of the present invention, the write throughput of the disk drive varies based on the number of blocks per segment and the frequency of the vibration. Consider the case where the segments are very long and the frequency of the vibration is high, then write aborts may occur multiple times within each segment such that a segment can never be written. Conversely if the segments are very short and the frequency of the vibration is low, it may still require several revolutions to write all the segments since the control circuitry is unable to execute short segment write commands consecutively due to the setup latency of each write command (i.e., there will be slipped commands). Accordingly, for a given vibration frequency, there is an optimal segment size (number of blocks per segment) that will maximize the write throughput of the disk drive (i.e., reduce the number of revolutions required to write the aborted segments) as illustrated in FIG. 5. In one embodiment of the present invention, the number of blocks per segment may be selected based on a frequency of a detected vibration.

Figure 6:
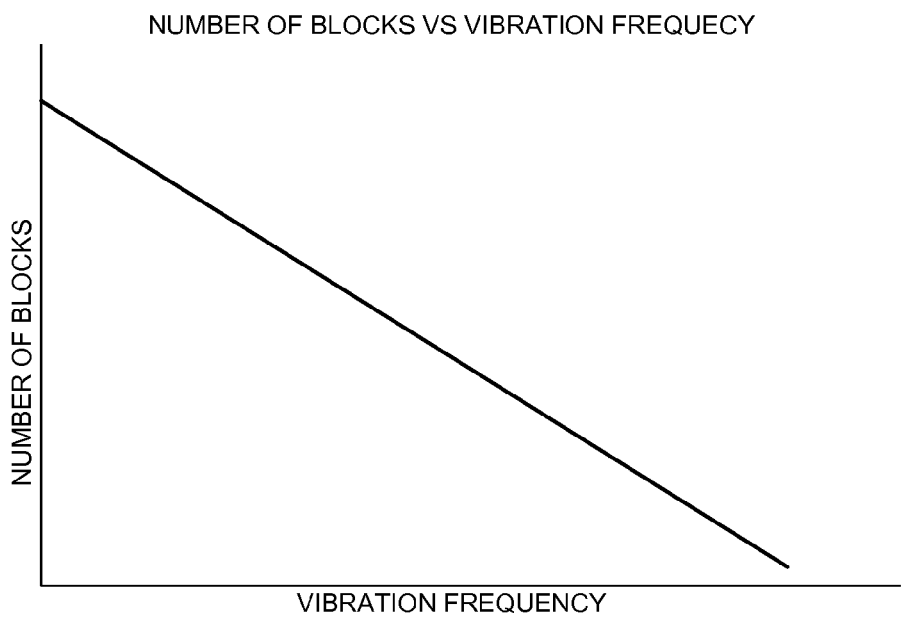
FIG. 6 is a graph according to an embodiment of the present invention where the number of blocks selected per segment is inversely proportional to a frequency of the vibration.

FIG. 6 illustrates an embodiment of the present invention wherein the number of blocks selected per segment varies inversely with the vibration frequency. That is, as the vibration frequency increases, the segment size is decreased so that the frequency of write aborts is balanced against the frequency of slipped commands due to the setup latency when writing consecutive segments.

Dividing a write operation into segments (commands) each having a number of blocks (e.g., data sectors) that is based on a detected vibration frequency improves the write throughput by writing as many segments as possible during each revolution of the disk. Although during any given revolution a certain number of segments may be missed (due to write aborts or slipped commands), the missed segments are eventually written during subsequent revolutions due to the phase of the write aborts shifting relative to the disk (due to the phase of the vibration shifting) as described above with reference to FIGS. 4A-4C.

Figure 7:
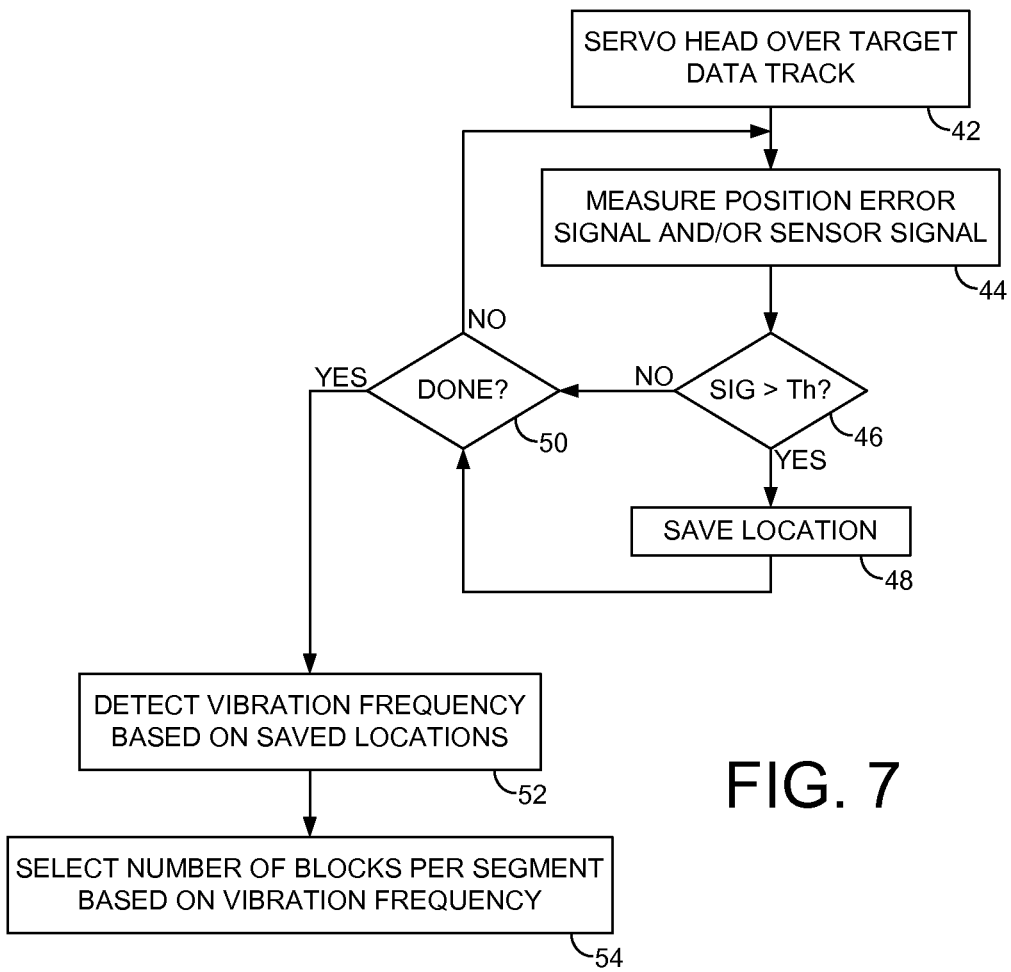
FIG. 7 is a flow diagram according to an embodiment of the present invention wherein a frequency of a vibration is detected based on a frequency that a position error signal or sensor signal exceeds a threshold.

The frequency of a vibration that is causing write aborts may be detected in any suitable manner. FIG. 7 is a flow diagram according to an embodiment of the present invention for detecting the frequency of a vibration, wherein while servoing the head over a target data track (step 42) the position error signal (PES) generated from reading the servo sectors and/or a sensor signal generated by any suitable transducer (e.g., an acceleration transducer or a fly height transducer) is measured (step 44). If the measured signal exceeds a threshold (step 46), the corresponding circumferential location of the head relative to the disk is saved (step 48). In one embodiment, the threshold at step 46 corresponds to a level that would trigger a write abort, and in another embodiment the threshold may correspond to a lower level so that if the magnitude of a vibration gradually increases, the frequency will be known as soon as the write aborts begin to occur. The flow diagram is repeated from step 44 until a sufficient number of measurements have been taken (step 50). The frequency of the vibration is then detected (step 52) by evaluating the locations saved at step 48, and the number of blocks per segment is then selected based on the detected frequency (step 54) as described above with reference to FIG. 6.

In one embodiment, a table is preconfigured with the optimal number of blocks per segment for each vibration frequency. The table may be populated during a design procedure for a family of disk drives by evaluating the write throughput of several sample drives at various vibration frequencies and for a number of segment sizes. The segment size that maximizes the throughput at each vibration frequency is then selected for the corresponding entry in the table. The table is then copied into each production drive during manufacturing and used to configure the segment size as the vibration frequencies are detected during normal operation while deployed in the field. In one embodiment, each production drive may tune the table entries by adjusting the segment size at each vibration frequency and monitoring the write throughput during write operations. If adjusting the segment size improves the write throughput, the corresponding table entry may be updated.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of data tracks;
   a head actuated over the disk; and
   control circuitry operable to:
   detect a vibration;
   configure a write operation by selecting a number of blocks for a first plurality of blocks and a second plurality of blocks based on a frequency of the detected vibration;
   write the first plurality of blocks to a target data track during a first revolution of the disk;
   write the second plurality of blocks to the target data track during a second revolution of the disk; and
   wherein the number of blocks is inversely proportional to the frequency of the vibration.

2. The disk drive as recited in claim 1, wherein the control circuitry is further operable to:
   configure the write operation to write the first and second and a third plurality of data blocks to the target data track; and
   write the first and third plurality of data blocks to the target data track during the first revolution.

3. The disk drive as recited in claim 2, wherein the control circuitry is further operable to:
   abort the write of the first plurality of blocks to the target data track during the first revolution of the disk when the detected vibration exceeds a threshold; and
   write the second plurality of blocks to the target data track during the second revolution after aborting the write of the first plurality of blocks to the target data track.

4. The disk drive as recited in claim 3, wherein the control circuitry is further operable to:
   write the first plurality of blocks prior to aborting the write operation; and
   write the third plurality of blocks after aborting the write operation.

5. The disk drive as recited in claim 1, wherein the control circuitry is further operable to:
   generate a position error signal (PES) representing a difference between a measured location of the head and a target location; and
   detect the frequency of the vibration based on the PES.

6. The disk drive as recited in claim 1, wherein the control circuitry is further operable to:
   generate a sensor signal representing the vibration; and
   detect the frequency of the vibration based on the sensor signal.

7. A method of operating a disk drive comprising a head actuated over a disk having a plurality of data tracks, the method comprising:
   detecting a vibration;
   configuring a write operation by selecting a number of blocks for a first plurality of blocks and a second plurality of blocks based on a frequency of the detected vibration;
   writing the first plurality of blocks to a target data track during a first revolution of the disk;
   writing the second plurality of blocks to the target data track during a second revolution of the disk; and
   wherein the number of blocks is inversely proportional to the frequency of the vibration.

8. The method as recited in claim 7, further comprising:
   configuring the write operation to write the first and second and a third plurality of data blocks to the target data track; and
   writing the first and third plurality of data blocks to the target data track during the first revolution.

9. The method as recited in claim 8, further comprising:
   aborting the writing of the first plurality of blocks to the target data track during the first revolution of the disk when the detected vibration exceeds a threshold; and
   writing the second plurality of blocks to the target data track during the second revolution after aborting the writing of the first plurality of blocks to the target data track.

10. The method as recited in claim 9, further comprising:
    writing the first plurality of blocks prior to aborting the write operation; and
    writing the third plurality of blocks after aborting the write operation.

11. The method as recited in claim 7, further comprising:
    generating a position error signal (PES) representing a difference between a measured location of the head and a target location; and
    detecting the frequency of the vibration based on the PES.

12. The method as recited in claim 7, further comprising:
    generating a sensor signal representing the vibration; and
    detecting the frequency of the vibration based on the sensor signal.

* * * * *